United States Patent
Zoller et al.

(10) Patent No.: US 11,879,030 B2
(45) Date of Patent: Jan. 23, 2024

(54) LIQUID COMPOSITION COMPRISING THREE INITIATORS, ITS PROCESS OF POLYMERIZATION, USE AND MATERIAL OR COMPOSITION OBTAINED FOLLOWING POLYMERIZATION OF COMPOSITION

(71) Applicant: Arkema France, Colombes (FR)

(72) Inventors: Alexander Zoller, Jurancon (FR); Pierre Gerard, Denguin (FR); Pierre Escale, Montardon (FR)

(73) Assignee: ARKEMA FRANCE, Colombes (FR)

( * ) Notice: Subject to any disclaimer, the term of this patent is extended or adjusted under 35 U.S.C. 154(b) by 386 days.

(21) Appl. No.: 17/253,151

(22) PCT Filed: Jun. 19, 2019

(86) PCT No.: PCT/EP2019/066293
§ 371 (c)(1),
(2) Date: Dec. 17, 2020

(87) PCT Pub. No.: WO2019/243469
PCT Pub. Date: Dec. 26, 2019

(65) Prior Publication Data
US 2021/0246249 A1    Aug. 12, 2021

(30) Foreign Application Priority Data
Jun. 21, 2018  (FR) ...................... 18.55539

(51) Int. Cl.
| | | |
|---|---|---|
| *C08F 265/06* | (2006.01) | |
| *B29C 70/06* | (2006.01) | |
| *B29C 70/00* | (2006.01) | |
| *C08J 5/24* | (2006.01) | |
| *B29K 33/00* | (2006.01) | |

(52) U.S. Cl.
CPC .......... *C08F 265/06* (2013.01); *B29C 70/003* (2021.05); *B29C 70/06* (2013.01); *C08J 5/249* (2021.05); *B29K 2033/12* (2013.01); *C08J 2333/12* (2013.01)

(58) Field of Classification Search
CPC ........ C08F 265/06; C08F 2/38; C08F 220/18; B29C 70/003; B29C 70/06; C08J 5/249; C08J 2333/12; C08J 5/0405; C08J 5/04; B29K 2033/12; F05B 2280/6003
USPC ........................................................ 523/202
See application file for complete search history.

(56) References Cited

U.S. PATENT DOCUMENTS

| | | |
|---|---|---|
| 4,211,742 A | 7/1980 | Kato et al. |
| 4,328,329 A | 5/1982 | Novak |
| 4,588,798 A | 5/1986 | Heitner |
| 4,605,717 A | 8/1986 | Heitner |
| 5,151,482 A | 9/1992 | Ikeda et al. |
| 10,040,889 B2 | 8/2018 | Gerard et al. |
| 10,294,358 B2 | 5/2019 | Gerard et al. |
| 10,500,339 B2 | 12/2019 | Gerard et al. |
| 10,800,904 B2 | 10/2020 | Gerard et al. |
| 11,459,416 B2 * | 10/2022 | Gerard ................. C08J 5/24 |
| 2020/0317843 A1 * | 10/2020 | Gerard ................. C08J 3/20 |
| 2021/0009740 A1 * | 1/2021 | Gerard ................. C08J 5/244 |

FOREIGN PATENT DOCUMENTS

KR     2004/0014252     2/2004

* cited by examiner

*Primary Examiner* — Hannah J Pak
(74) *Attorney, Agent, or Firm* — BUCHANAN, INGERSOLL & ROONEY PC

(57) ABSTRACT

The present invention relates to a liquid composition comprising a monomer, a (meth)acrylic polymer and at least three initiators. In particular the present invention relates to a liquid composition comprising a monomer, a (meth)acrylic polymer and at least three initiators that have a different half life time. That liquid composition can be used as a syrup and especially as a syrup for impregnation of fibres or fibrous material. Also concerned is a thermoplastic material obtained after polymerization of the liquid composition. The invention also relates to a process for manufacturing such a liquid composition. The invention also relates to a process for impregnating a fibrous substrate of long fibres with said liquid composition. The invention also relates to a fibrous substrate impregnated with said liquid composition which is useful for manufacturing composite parts. The present invention also relates to a process for manufacturing mechanical parts or structural elements made of composite material and to mechanical parts or structural elements made of composite material obtained via a process using such a liquid composition.

14 Claims, No Drawings

LIQUID COMPOSITION COMPRISING THREE INITIATORS, ITS PROCESS OF POLYMERIZATION, USE AND MATERIAL OR COMPOSITION OBTAINED FOLLOWING POLYMERIZATION OF COMPOSITION

This application claims benefit, under U.S.C. § 119 or § 365 of PCT Application Number PCT/EP2019/066293, filed Jun. 19, 2019, and French Patent Application Number FR 1855539 filed Jun. 21, 2018, these documents being incorporated herein by reference.

FIELD OF THE INVENTION

The present invention relates to a liquid composition comprising a monomer, a (meth)acrylic polymer and at least three initiators.

In particular the present invention relates to a liquid composition comprising a monomer, a (meth)acrylic polymer and at least three initiators that have a different half life time. That liquid composition can be used as a syrup and especially as a syrup for impregnation of fibres or fibrous material. Also concerned is a thermoplastic material obtained after polymerization of the liquid composition. The invention also relates to a process for manufacturing such a liquid composition. The invention also relates to a process for impregnating a fibrous substrate of long fibres with said liquid composition. The invention also relates to a fibrous substrate impregnated with said liquid composition which is useful for manufacturing composite parts.

The present invention also relates to a process for manufacturing mechanical parts or structural elements made of composite material and to mechanical parts or structural elements made of composite material obtained via a process using such a liquid composition.

PRIOR ART

Thermoplastic polymers are materials that are widely used today in several fields and applications, for example in the construction, aeronautic, automobile or railway sectors, where they are part of mechanical parts.

These mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sports notably due to their better mechanical performance (higher tensile strength, higher tensile modulus, higher fracture toughness) and their low density, in comparison with homogeneous materials.

To allow thermoforming and recycling, it is preferred to use thermoplastic polymers also in composite materials.

Thermoplastic polymers consist of linear or branched polymers, which are usually not crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material.

At the time of impregnation, when preparing polymeric composites, the viscosity of the impregnation syrup must be controlled and adapted so as not to be too fluid or too viscous, so as to impregnate correctly each fibre of the fibrous substrate. When the wetting is partial, depending on whether the syrup is too fluid or too viscous, "naked" zones, i.e. non-impregnated zones, and zones in which drops of polymer form on the fibres, which are the cause of the creation of bubbles, respectively appear. These "naked" zones and these bubbles give rise to the appearance of defects in the final composite material, which are the cause, inter alia, of a loss of mechanical strength of the final composite material.

Also when used without impregnation, it is wished to have a liquid composition that polymerizes fast with a good conversion in order to increase productivity.

A liquid composition or syrup comprising a (meth)acrylic monomer and a (meth)acrylic polymer is described in WO 2013/056845 and WO 2014/013028. The polymerization of the monomer(s) in both documents is achieved with radical generating initiator(s) or initiating systems comprising radical generation initiator system(s). For both documents benzoyl peroxide is used in the examples.

The document WO2014/174098 discloses a liquid (meth) acrylic syrup. The syrup comprises an initiating system comprising an accelerator, an organic aldehyde, one peracid and one liquid peroxy compound. The polymerization time in the examples of this document is hours or several dozens of minutes.

The document WO2015/110534 discloses an impregnation process for a fibrous substrate, a liquid monomer syrup for impregnating process, its method of polymerization and structural article obtained thereof. The document just discloses in a general manner a list of initiators and that a combination of two of them might be used.

The document WO2013/056845 discloses a composite material via in-situ polymerization od thermoplastic (meth) acrylic resins. The document just discloses in a general manner a list of initiators and that a combination of two of them might be used.

The document U.S. Pat. No. 4,328,329 discloses a process for polymerizing methyl methacrylate syrup using a dual initiator system. The process concerns a cast sheet process with cycle times of several dozen minutes and temperature profile going 80° C. to 135° C. during polymerization. One of the used initiators is always 2,2'-azobis(isobutyronitrile).

The document U.S. Pat. No. 4,605,717 discloses the preparation of acrylic polymer sheets using a ternary peroxide initiator system. The process uses two temperature ranges, from 45° C. to 90° C. for the first two initiators and from 110° C. to 140° C. for a final cure with the third initiator.

The document EP 0189930 discloses a process for preparing acrylic polymers using a dual peroxide initiator system. The process uses two temperature ranges, from 45° C. to 90° C. for 10 to 100 minutes for the first initiator and from 110° C. to 140° C. for 5 to 60 minutes a final cure with the second initiator.

The document U.S. Pat. No. 5,151,482 discloses a process the production of methecrylic resin sheets. In this process the two initiators are used. The process comprises also different temperature ramps, including heating and cooling ramps and high temperature curing at the end.

The document U.S. Pat. No. 4,211,742 discloses a process for the continuous casting of liquid polymerizable compositions. The polymerization times are at least 15 minutes even if the sheet has a thickness of 3 mm. The process comprises also different temperature ramps and high temperature curing at the end.

The document FR 1663063, a French patent application, discloses a liquid composition comprising a monomer, a (meth)acrylic polymer and at least two initiators, where two initiators that have a different half life time.

The document KR2004/0014252 discloses an impact resistant methacrylic molded article and a method for producing the same. The process uses a ternary peroxide initiator system and large temperature ranges, from 46° C. to 120° C. for several hours.

It is not suggested in any of these documents that incorporation of three initiators, into a liquid composition allows fast and complete polymerization, especially in short cycle times of less than 15 minutes and having low residual monomer content, especially process with simple temperature profile.

Technical Problem

The aim of the invention is thus to remedy at least one of the drawbacks of the prior art.

An objective of the present invention is to have a liquid composition comprising a monomer, a (meth)acrylic polymer and initiators for having a composition that can be polymerized fast and to a good conversion. By a good conversion is understood that at least 95% of the monomers have been polymerized, preferably at least 99%. By fast is understood that the polymerization takes place in less than 15 minutes, preferably less than 10 min, even more preferably less than 5 min and advantageously less than 3 min.

An objective of the present invention is also to have a process for polymerizing fast a liquid composition comprising a monomer, a (meth)acrylic polymer and initiators to a good conversion and easy de-moulding.

Still another objective of the present invention is to use a liquid composition comprising a monomer, a (meth)acrylic polymer and initiators for having a fast polymerization and a good conversion, having residual monomer of less than 1% based on initially employed monomer quantity.

The invention is also directed toward completely, correctly and uniformly wetting the fibrous substrate during the impregnation. Any defects of fibre wetting, for example by bubbles and voids, decrease the mechanical performance of the manufactured mechanical or structured parts or articles or final composite part.

Another object of the present invention is to propose a process that can be performed at low cost and that allows industrial-scale manufacture of mechanical parts or structural elements made of thermoplastic polymer or thermoplastic composite material. In addition, the process should be easy and simple to perform using commercially available compounds. The manufacture of the composite parts should also be reproducible and fast, meaning short cycle times of less than 15 min, preferably less than 10 min, even more preferably less than 5 min and advantageously less than 3 min.

BRIEF DESCRIPTION OF THE INVENTION

It has been discovered, surprisingly, that a liquid composition comprising
a) a (meth)acrylic polymer (P1),
b) a (meth)acrylic monomer (M1), and
c) three initiators (Ini1), (Ini2) and (Ini3);
said liquid (meth)acrylic syrup having a dynamic viscosity of between 10 mPa*s and 10 000 mPa*s at 25° C., yields to a thermoplastic polymer composition after polymerization of said (meth)acrylic monomer (M1), said thermoplastic polymer composition is having a fast kinetics and a high conversion of the (meth)acrylic monomer (M1), in comparison to a composition comprising only one initiator (Ini1) or (Ini2) or mixture of (Ini1) and (Ini2).

It has also been discovered that a liquid composition comprising
a) a (meth)acrylic polymer (P1),
b) a (meth)acrylic monomer (M1), and
c) three initiators (Ini1) (Ini2) and (Ini3);
said liquid (meth)acrylic syrup having a dynamic viscosity of between 10 mPa*s and 10 000 mPa*s at 25° C., can be used to produce a thermoplastic polymer composition after polymerization of said (meth)acrylic monomer (M1), said thermoplastic polymer composition is having a low content of residual monomer, in comparison to a composition comprising only one initiator (Ini1) or (Ini2) or mixture of (Ini1) and (Ini2).

It has also been discovered that a liquid composition comprising
a) a (meth)acrylic polymer (P1),
b) a (meth)acrylic monomer (M1), and
c) three initiators (Ini1) (Ini2) and (Ini3);
said liquid (meth)acrylic syrup having a dynamic viscosity of between 10 mPa*s and 10 000 mPa*s at 25° C., can be used to produce a thermoplastic polymer composition after polymerization of said (meth)acrylic monomer (M1), much faster said and the thermoplastic polymer composition is having a low content of residual monomer in comparison to a composition comprising only one initiator (Ini1) or (Ini2) or mixture of (Ini1) and (Ini2).

It has been discovered as well that a liquid (meth)acrylic composition for impregnating a fibrous substrate, said fibrous substrate consisting of long fibres, said composition being characterized in that it comprises:
a) a (meth)acrylic polymer (P1),
b) a (meth)acrylic monomer (M1), and
c) three initiators (Ini1) (Ini2) and (Ini3);
said liquid (meth)acrylic syrup having a dynamic viscosity of between 10 mPa*s and 10 000 mPa*s at 25° C.;
gives total and correct impregnation of the fibrous substrate.

The Applicant has also discovered, surprisingly, that an impregnation process for impregnating a fibrous substrate, said fibrous substrate consisting of long fibres and said process comprising a step of impregnating said fibrous substrate with said liquid composition or liquid (meth) acrylic impregnation syrup, gives full and correct impregnation of the fibrous substrate and allows fast and complete polymerization to good conversion, in comparison to a composition comprising only initiator (Ini1) or (Ini2) or mixture of (Ini1) and (Ini2).

It has also been discovered, surprisingly, that a process for manufacturing composite parts, comprising the following steps:
  i) impregnating a fibrous substrate with such a liquid composition or (meth)acrylic syrup comprising
    a) a (meth)acrylic polymer (P1),
    b) a (meth)acrylic monomer (M1), and
    c) three initiators (Ini1), (Ini2) and (Ini3);
  ii) polymerizing the liquid (meth)acrylic syrup impregnating said fibrous substrate,
makes it possible to obtain thermoplastic composite parts with significantly improved productivity.

Moreover, it has also been discovered that a composite part obtained by the manufacturing process, is having significantly improved residual monomer content, due to better conversion of the monomer. The residual monomer content is less than 5% relative to the quantity of the used monomer.

DETAILED DESCRIPTION

According to a first aspect, the present invention relates to a liquid composition comprising:
  a) a (meth)acrylic polymer (P1),
  b) a (meth)acrylic monomer (M1), and
  c) three initiators (Ini1), (Ini2) and (Ini3);
said liquid composition is having a dynamic viscosity of between 10 mPa*s and 10 000 mPa*s at 25° C.

According to a second aspect, the present invention relates to a liquid composition for impregnating a fibrous substrate, said fibrous substrate consisting of long fibres, and said liquid composition being characterized in that it comprises:
  a) a (meth)acrylic polymer (P1),
  b) a (meth)acrylic monomer (M1), and
  c) three initiators (Ini1), (Ini2) and (Ini3);
said liquid (meth)acrylic syrup having a dynamic viscosity of between 10 mPa*s and 10 000 mPa*s at 25° C.

According to a third aspect, the present invention relates to process for preparing a liquid composition, said liquid composition is being characterized in that it comprises:
  a) a (meth)acrylic polymer (P1),
  b) a (meth)acrylic monomer (M1), and
  c) three initiators (Ini1), (Ini2) and (Ini3);
  said liquid (meth)acrylic syrup having a dynamic viscosity of between 10 mPa*s and 10 000 mPa*s at 25° C., by a process comprising the following steps:
    i) preparing a liquid mixture of (meth)acrylic polymer (P1) and (meth)acrylic monomer (M1)
    ii) adding initiators (Ini1), (Ini2) and (Ini3) together or one after the other to the mixture prepared in the previous step.

According to a fourth aspect, the present invention relates to the use of a liquid composition for impregnating a fibrous substrate, said fibrous substrate consisting of long fibres, and said liquid composition being characterized in that it comprises:
  a) a (meth)acrylic polymer (P1),
  b) a (meth)acrylic monomer (M1), and
  c) three initiators (Ini1), (Ini2) and (Ini3);
said liquid (meth)acrylic syrup having a dynamic viscosity of between 10 mPa*s and 10 000 mPa*s at 25° C.

According to a fifth aspect, the present invention relates to the use of a liquid composition for manufacturing thermoplastic parts or manufacturing composite parts, and said liquid composition being characterized in that it comprises:
  a) a (meth)acrylic polymer (P1),
  b) a (meth)acrylic monomer (M1), and
  c) three initiators (Ini1), (Ini2) and (Ini3);
said liquid (meth)acrylic syrup having a dynamic viscosity of between 10 mPa*s and 10 000 mPa*s at 25° C.

According to a sixth aspect, the present invention relates to process for manufacturing thermoplastic parts by a process comprising the following steps:
  i) preparing a liquid mixture of (meth)acrylic polymer (P1) and (meth)acrylic monomer (M1)
  ii) adding initiators (Ini1), (Ini2) and (Ini3) together or one after the other to the mixture prepared in previous step.
  iii) putting the liquid (meth)acrylic composition prepared in i) and ii) in means for polymerization, said composition is being characterized in that it comprises:
    a) a (meth)acrylic polymer (P1),
    b) a (meth)acrylic monomer (M1), and
    c) three initiators (Ini1), (Ini2) and (Ini3);
    said liquid (meth)acrylic syrup having a dynamic viscosity of between 10 mPa*s and 10 000 mPa*s at 25° C.,
  iv) polymerizing.

According to a seventh aspect, the present invention relates to process for manufacturing composite parts by a process comprising the following steps:
  i) preparing a mixture of (meth)acrylic polymer (P1) and (meth)acrylic monomer (M1)
  ii) adding initiators (Ini1), (Ini2) and (Ini3) together or one after the other to the mixture prepared in previous step.
  iii) impregnating fibres or fibrous substrate with the liquid (meth)acrylic composition prepared in i) and ii), said composition is being characterized in that it comprises:
    a) a (meth)acrylic polymer (P1),
    b) a (meth)acrylic monomer (M1), and
    c) three initiators (Ini1), (Ini2) and (Ini3);
    said liquid (meth)acrylic syrup having a dynamic viscosity of between 10 mPa*s and 10 000 mPa*s at 25° C.,
  iv) polymerizing.

The term "fibrous substrate" as used refers to several fibres, uni directional rovings or continuous filament mat, fabrics, felts or nonwovens that may be in the form of strips, laps, braids, locks or pieces.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule that can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous of soft when heated and that can take on new shapes by the application of heat and pressure. This applies also for slightly crosslinked thermoplastic polymers that can be thermoformed when heated above the softening temperature.

The term "polymer composite" as used refers to a multicomponent material comprising several different phase domains, among which at least one type of phase domain is a continuous phase and in which at least one component is a polymer.

The term "initiator" as used refers to a compound that can start/initiate the polymerization of a monomer or monomers.

The term "half life time" t½ as used refers to the time needed for an initial amount of initiator to decrease concentration in half. This time is a function of the temperature.

By the abbreviation "phr" is meant weight parts per hundred parts of composition. For example 1 phr of initiator in the composition means that 1 kg of initiator is added to 100 kg of composition.

By the abbreviation "ppm" is meant weight parts per million parts of composition. For example 1000 ppm of a compound in the composition means that 0.1 kg of compound is present in 100 kg of composition.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The liquid composition or (meth)acrylic syrup according to the invention comprises a (meth)acrylic monomer (M1) or a mixture of (meth)acrylic monomers (M1) and (M1+x), a (meth)acrylic polymer (P1) and at least three initiators (Ini1), (Ini2) and (Ini3).

The dynamic viscosity of the liquid composition or (meth)acrylic syrup is in a range from 10 mPa*s to 10000 mPa*s, preferably from 20 mPa*s to 7000 mPa*s and advantageously from 20 mPa*s to 5000 mPa*s and more advantageously from 20 mPa*s to 2000 mPa*s and even more advantageously between 20 mPa*s and 1000 mPa*s. The viscosity of the syrup can be easily measured with a Rheometer or viscosimeter. The dynamic viscosity is measured at 25° C. If the liquid (meth) acrylic syrup has a Newtonian behaviour, meaning no shear thinning, the dynamic viscosity is independent of the shearing in a rheometer or the speed of the mobile in a viscometer. If the liquid composition has a non-Newtonian behaviour, meaning shear thinning, the dynamic viscosity is measured at a shear rate of 1 $s^{-1}$ at 25° C.

The liquid composition or (meth)acrylic syrup according to the invention, for impregnating the fibrous substrate, especially comprises a (meth)acrylic monomer or a mixture of (meth)acrylic monomers, a (meth)acrylic polymer and at least three initiators (Ini1), (Ini2) and (Ini3).

As regards the liquid composition of the invention it comprises a (meth)acrylic monomer (M1), a (meth)acrylic polymer (P1) and at least three initiators (Ini1), (Ini2) and (Ini3). Once polymerized the (meth)acrylic monomer (M1) is transformed to a (meth)acrylic polymer (P2) comprising the monomeric units of (meth)acrylic monomer (M1).

The quantity of three initiators (Ini1), (Ini2) and (Ini3) together in the composition is at least 0.1 phr relative to the sum of (meth)acrylic monomer (M1) and (meth)acrylic polymer (P1). Preferably the quantity of three initiators (Ini1), (Ini2) and (Ini3) together in the composition is at least 0.2 phr, more preferably at least 0.5 phr, even more preferably at least 0.75 phr and advantageously at least 1 phr relative to the sum of (meth)acrylic monomer (M1) and (meth)acrylic polymer (P1).

The quantity of three initiators (Ini1), (Ini2) and (Ini3) together in the composition is at most 15 phr of relative to the sum of (meth)acrylic monomer (M1) and (meth)acrylic polymer (P1). Preferably the quantity of two initiators (Ini1) and (Ini2) together in the composition is at most 12 phr, more preferably at most 10 phr, even more preferably at most 8 phr and advantageously at most 5 phr relative to the sum of (meth)acrylic monomer (M1) and (meth)acrylic polymer (P1).

The quantity three initiators (Ini1), (Ini2) and (Ini3) together in the composition is between 0.1 phr and 15 phr relative to the sum of (meth)acrylic monomer (M1) and (meth)acrylic polymer (P1). Preferably the quantity three initiators (Ini1), (Ini2) and (Ini3) together in the composition is between 0.2 phr and 12 phr, more preferably between 0.5 phr and 10 phr, even more preferably between 0.75 phr and 8 phr and advantageously at most between 1 phr and 5 phr relative to the sum of (meth)acrylic monomer (M1) and (meth)acrylic polymer (P1).

As regards the (meth)acrylic monomer (M1), the monomer is chosen from acrylic acid, methacrylic acid, alkyl acrylic monomers, alkyl methacrylic monomers, hydroxyalkyl acrylic monomers and hydroxyalkyl methacrylic monomers, and mixtures thereof.

Preferably, the (meth)acrylic monomer (M1) is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer (M1) is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth)acrylic monomer (M1) is methyl methacrylate.

According to a first more preferred embodiment, at least 50% by weight, preferably at least 60% by weight, more preferably at least 70% by weight, advantageously at least 80% by weight and even more advantageously 90% by weight of the monomer (M1) is a mixture of methyl methacrylate with optionally at least one other monomer.

According to a second more preferred embodiment the liquid composition or (meth)acrylic syrup comprises a monomer (M2) between 0.01 and 10 phr by weight relative to the sum of (meth)acrylic monomer (M1) and (meth)acrylic polymer (P1), said (meth)acrylic monomer (M2) comprises at least two (meth)acrylic functions; and advantageously between 0.1 and 5 phr by weight of said (meth)acrylic monomer (M2).

The (meth)acrylic monomer (M2) can be chosen from ethylene glycol dimethacrylate, neopentyl glycol diacrylate, neopentyl glycol dimethacrylate, 1,4-butanediol dimethacrylate, 1,4-butanediol diacrylate, 1,3-butylene glucol diacrylate, 1,3-butylene glucol dimethacrylate.

As regards the (meth)acrylic polymer (P1), mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth) acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer (P1) should be high, which means greater than 50 000 g/mol and preferably greater than 100 000 g/mol.

The weight-average molecular mass can be measured by size exclusion chromatography (SEC).

The (meth)acrylic polymer is fully soluble in the (meth) acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C.

Advantageously, the liquid (meth)acrylic syrup contains no additional voluntarily added solvent.

With regard to the three initiators (Ini1), (Ini2) and (Ini3), the initiators generate radicals that initiate the monomer(s) to start a radical polymerization of the monomer in order to form the polymer chains by propagation.

Preferably the initiators (Ini1), (Ini2) and (Ini3) are activated by heat.

The heat activated initiators (Ini1), (Ini2) and (Ini3) are preferably radical initiators.

The radical initiators (Ini1), (Ini2) and (Ini3) can be chosen from peroxy group comprising compound or azo group comprising compounds and preferably from peroxy group comprising compound.

Preferably the peroxy group comprising compound comprises from 2 to 30 carbon atoms.

Preferably the peroxy group comprising compound is chosen from diacyl peroxides, peroxy esters, peroxydicarbonates, dialkyl peroxides, peroxyacetals, hydroperoxide or peroxyketale.

Preferably the two initiators (Ini1), (Ini2) and (Ini3) have at any given temperature $T_1$ different half-life times $t_{1/2}$.

Still more preferably the third initiator (Ini3) has at a given temperature $T_1$ a half-life time $t_{1/2}$ that is more important than half-life time $t_{1/2}$ of second initiator (Ini2) at $T_1$ and the second initiator (Ini2) has at a given temperature $T_1$ a half-life time $t_{1/2}$ that is more important than half-life time $t_{1/2}$ of first initiator (Ini1) at $T_1$.

Still more preferably the second initiator (Ini2) has at a given temperature $T_1$ a half-life time $t_{1/2}$ that is at least two times of the half-life time $t_{1/2}$ of the first initiator (Ini1). Even more preferably the second initiator (Ini2) has at a given temperature T1 a half-life time $t_{1/2}$ that is at least three times, of the half-life time $t_{1/2}$ of the first initiator (Ini1).

Still more preferably the third initiator (Ini3) has at a given temperature $T_1$ a half-life time $t_{1/2}$ that is at least two times of the half-life time $t_{1/2}$ of the second initiator (Ini2). Even more preferably the third initiator (Ini3) has at a given temperature T1 a half-life time $t_{1/2}$ that is at least three times, of the half-life time $t_{1/2}$ of the second initiator (Ini2).

Preferably the temperature $T_1$ is between 40° C. and 160° C., more preferably between 40° C. and 140° C. and advantageously between 50° C. and 130° C.

More preferably, the first initiator (Ini1) has a half-life time $t_{1/2}$ of 1 hour at a temperature between 40° C. and 90° C., still more preferably between 45° C. and 80° C. and even more preferably between 50° C. and 75° C.

More preferably, the second initiator (Ini2) has a half-life time $t_{1/2}$ of 1 hour at a temperature of at least 70° C., still more preferably of at least 75° C.

More preferably, the second initiator (Ini2) has a half-life time $t_{1/2}$ of 1 hour at a temperature between 70° C. and 100° C., still more preferably between 70° C. and 90° C. and even more preferably between 75° C. and 85° C.

More preferably, the third initiator (Ini3) has a half-life time $t_{1/2}$ of 1 hour at a temperature of at least 75° C., still more preferably of at least 80° C. and even more preferably at least 85° C.

More preferably, the third initiator (Ini3) has a half-life time $t_{1/2}$ of 1 hour at a temperature between 75° C. and 160° C., still more preferably between 80° C. and 140° C. and even more preferably between 85° C. and 130° C.

Preferably the temperature for a given half-life time between the initiators (Ini3), (Ini2) and (Ini1) is different by at least 5K. This means if for a half time $t_{1/2}$ of 1 hour, the temperature of (Ini1) is 75° C., that the temperature of (Ini2) is at least 80° C. and the temperature of (Ini3) is at least 85° C.

Preferably the temperature for a given half-life time between the initiators (Ini3), (Ini2) and (Ini1) is different by at most 50K. This means if for a half time $t_{1/2}$ of 1 hour, the temperature of (Ini1) is 50° C., and the temperature of (Ini3) is at most 100° C.

More preferably the temperature for a given half-life time between the initiators (Ini2) and (Ini1) is different by at least 5K to 50K and more preferably by at least 6K to 40K and even more preferably by at least 7K to 30K.

More preferably the temperature for a given half-life time between the initiators (Ini3) and (Ini1) is different by at least 10K to 50K and more preferably by at least 15K to 40K and even more preferably by at least 20K to 40K.

The initiators (Ini3), (Ini2) and (Ini1) are chosen from diisobutyryl peroxide, cumyl peroxyneodecanoate, di(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide, 3,6,9-triethyl-3,6,9-trimethyl-1,4,7-triperoxonane, 2,2'-azobisisobutyronitrile (AIBN), 2,2'-azodi-(2-methylbutyronitrile), azobisisobutyramide, 2,2'-azobis(2,4-dimethylvaleronitrile), 1,1'-Azodi(hexahydrobenzonitrile), or 4,4'-azobis(4-cyanopentanoic) and the choice of the respective three initiators (Ini3), (Ini2) and (Ini1) is made in view of the characteristics outlined before for the three initiators (Ini3), (Ini2) and (Ini1).

Preferably the initiator (Ini1) is chosen from cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane or 1,1,3,3-tetramethylbutyl peroxy-2-ethylhexanoate.

Preferably the initiator (Ini2) is chosen from tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide or 3,6,9-triethyl-3,6,9-trimethyl-1,4,7-triperoxonane.

Preferably the initiator (Ini3) is chosen from tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy) cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide or 3,6,9-triethyl-3,6,9-trimethyl-1,4,7-triperoxonane The weight ratio between each two of the three initiators (Ini3), (Ini2) and (Ini1) is between 1/10 and 10/1, preferably between 1/5 and 5/1 and more preferably between 1/4 and 4/1.

Preferably the initiator (Ini1) is chosen from peroxydicarbonates. Preferably the initiator (Ini1) has a maximal storage temperature of 20° C. or less.

More preferably the initiator (Ini1) has following general formula (1):

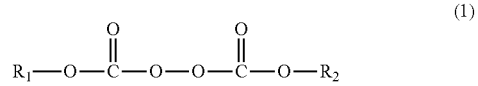

wherein $R_1$ and $R_2$ each present and alkyl group, that could be linear, branched or cyclic, or a combination of the three, having at least 6 carbon atoms, preferably 8 carbon atoms and more preferably at least 10 carbon atoms. Advantageously the groups $R_1$ and $R_2$ each have between 10 and 30 carbon atoms and more advantageously between 10 and 20 carbon atoms. The groups $R_1$ and $R_2$ can be different or identical.

Even more preferably the initiator (Ini1) is chosen from di(4-tert-butylcyclohexyl) peroxydicarbonate, dicetyl peroxydicarbonate and dimyristyl peroxydicarbonate and initiator (Ini2) is chosen from benzoyl peroxide, t-butylperoxy 2-ethylhexanoate, dilauroyl peroxide, 2,5-dimethyl-2,5-di(2-ethylhexanoyl peroxy)hexane and didecanoyl peroxide and The initiator (Ini3) is chosen from benzoyl peroxide or t-butylperoxy 2-ethylhexanoate or 2,5-dimethyl-2,5-di(2-ethylhexanoyl peroxy)hexane.

In a first even more preferred embodiment the initiator (Ini1) is chosen from di(4-tert-butylcyclohexyl) peroxydicarbonate.

The initiator (Ini2) in this first even more preferred embodiment is chosen from, dilauroyl peroxide and didecanoyl peroxide.

The initiator (Ini3) in this first even more preferred embodiment is chosen from benzoyl peroxide or t-butylperoxy 2-ethylhexanoate or 2,5-dimethyl-2,5-di(2-ethylhexanoyl peroxy)hexane.

In a second even more preferred embodiment the initiator (Ini1) is chosen from dicetyl peroxydicarbonate.

The initiator (Ini2) in this second even more preferred embodiment is chosen from dilauroyl peroxide and didecanoyl peroxide.

The initiator (Ini3) in this second even more preferred embodiment is chosen from benzoyl peroxide or t-butylperoxy 2-ethylhexanoate or 2,5-dimethyl-2,5-di(2-ethylhexanoyl peroxy)hexane.

In a third even more preferred embodiment the initiator (Ini1) is chosen from dimyristyl peroxydicarbonate.

The initiator (Ini2) in this third even more preferred embodiment is chosen from dilauroyl peroxide and didecanoyl peroxide.

The initiator (Ini3) in this third even more preferred embodiment is chosen benzoyl peroxide or t-butylperoxy 2-ethylhexanoate or 2,5-dimethyl-2,5-di(2-ethylhexanoyl peroxy)hexane.

In order to conserve a dynamic viscosity of the liquid composition or (meth)acrylic syrup, also that it allows good impregnation of the fibrous substrate if necessary, and to conserve the thermoplastic properties of the matrix obtained after polymerization of the fibrous substrate preimpregnated with syrup, the compounds of the syrup are incorporated in the following mass percentages:

The (meth)acrylic monomer(s) (M1) in the liquid composition or (meth)acrylic syrup are present in proportions of between 40% and 90% by weight and preferably between 45% and 85% by weight of the composition comprising (meth)acrylic monomer(s) (M1) and (meth)acrylic polymer (P1).

The (meth)acrylic polymer(s) (P1) in the liquid composition or (meth)acrylic syrup are present in a proportion of at least 1% by weight, preferably at least 5% and advantageously at least 10% by weight of the composition comprising (meth)acrylic monomer(s) (M1) and (meth)acrylic polymer (P1).

The (meth)acrylic polymer(s) (P1) in the liquid (meth) acrylic syrup are present in a proportion of not more than 50% by weight, preferably not more than 40% and advantageously not more than 30% by weight of the composition comprising (meth)acrylic monomer(s) (M1) and (meth) acrylic polymer (P1).

All the optional additives and fillers are added to the liquid (meth)acrylic syrup before the impregnation and or polymerization.

As regards the process for manufacturing the liquid composition or (meth)acrylic syrup, a first step consists in preparing a first syrup comprising the (meth)acrylic monomer (M1) or mixture of (meth)acrylic monomers and a (meth)acrylic polymer (P1). The initiators (Ini3), (Ini2) and (Ini1) are then added to the syrup, in the proportions indicated above to conserve a dynamic viscosity of between 10 mPa*s and 10 000 mPa*s, at 25° C.

Preferably the (meth)acrylic polymer (P1) is added to the (meth)acrylic monomers and solubilized.

The initiators (Ini3), (Ini2) and (Ini1) can be added together or apart one after the other. If added apart the order is not of importance.

Preferably the initiators (Ini3), (Ini2) and (Ini1) are added at a temperature $T_{add}$ below 50° C., more preferably below 40° C., advantageously below 30° C. and more advantageously below 25° C.

The liquid composition according to the invention, detailed in previous paragraphs, can be used for impregnating fibres or fibrous substrate or for manufacturing thermoplastic parts or manufacturing composite parts.

As regards the process for impregnating the fibres or fibrous substrate, it comprises a step of impregnating the fibrous substrate with the liquid composition or (meth) acrylic syrup.

This impregnation step can take place in a mold or closed mold or a bath.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of several fibres, uni directional rovings or continuous filament mat, fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibres. When the fibres are continuous, their assembly forms fabrics.

The one-dimensional form corresponds to linear long fibres. The fibres may be discontinuous or continuous. The fibres may be arranged randomly or parallel to each other, in the form of a continuous filament. A fibre is defined by its aspect ratio, which is the ratio between the length and diameter of the fibre. The fibres used in the present invention are long fibres or continuous fibres. The fibres have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibres, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibres or mixtures thereof, an assembly of the two-dimensional form in the third dimension.

The origins of the fibrous material may be natural or synthetic. As natural material one can mention plant fibres, wood fibres, animal fibres or mineral fibres.

Natural fibres are, for example, sisal, jute, hemp, flax, cotton, coconut fibres, and banana fibres. Animal fibres are, for example, wool or hair.

As synthetic material, mention may be made of polymeric fibres chosen from fibres of thermosetting polymers, of thermoplastic polymers or mixtures thereof.

The polymeric fibres may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibres may also be chosen from glass fibres, especially of E, R or S2 type, carbon fibres, boron fibres or silica fibres.

The fibrous substrate of the present invention is chosen from plant fibres, wood fibres, animal fibres, mineral fibres, synthetic polymeric fibres, glass fibres and carbon fibres, and mixtures thereof.

Preferably, the fibrous substrate is chosen from mineral fibres.

The fibres of the fibrous substrate have a diameter between 0.005 µm and 100 µm, preferably between 1 µm and 50 µm, more preferably between 5 µm and 30 µm and advantageously between 10 µm and 25 µm.

Preferably, the fibres of the fibrous substrate of the present invention are chosen from continuous fibres (meaning that the aspect ratio does not necessarily apply as for long fibres) for the one-dimensional form, or for long or continuous fibres for the two-dimensional or three-dimensional form of the fibrous substrate.

According to another additional aspect, the invention relates to a polymeric composite material comprising a thermoplastic (meth)acrylic matrix and a fibrous substrate used as reinforcement, in which the fibrous substrate consists of long fibres, said composite material being characterized in that the thermoplastic (meth)acrylic matrix is obtained after polymerization of said fibrous substrate pre-impregnated with said liquid composition according to the invention or (meth)acrylic syrup.

Another aspect of the present invention is a process for manufacturing mechanical or structured parts or products, comprising the following steps:
i) impregnating a fibrous substrate with the liquid composition or (meth)acrylic syrup according to the invention,
ii) polymerizing the liquid composition or (meth)acrylic syrup impregnating said fibrous substrate.

The polymerization of the liquid composition or (meth)acrylic syrup that has impregnated the fibrous substrate during the process for manufacturing mechanical or structured parts or products during polymerizing step in all embodiments of the invention, takes place at temperature between 80° C. and 140° C., preferably between 90° C. and 130° C., even more preferably between 100° C. and 125° C. The polymerization step in all embodiments of the invention is isotherm. By isotherm is meant in the present invention that the temperature during polymerization is kept in an interval of ΔT of 20K of the polymerization temperature and comprises no temperature ramps, where the temperature is for example decreased during polymerization or increased at the end and the difference of temperature during polymerization is more than 20K. The temperature during polymerization is also called polymerization temperature. For example the impregnated fibrous substrate is heated up to 100° C. and the temperature at the end does not exceed 125° C. or preferably 120° C. Or for example the impregnated the fibrous substrate is heated up to 115° C. and the temperature during the polymerization step stays inside an interval of 20K: between 105° C. and 125° C. or also between 100° C. and 120° C.

Advantageously the polymerization temperature is kept in an interval of ΔT of 18K, more advantageously of 16K, even more advantageously of 14K, still more advantageously of 12K and most advantageously of 10K.

As regards the process for manufacturing composite parts, but also mechanical or structured parts or products, various processes could be used for preparing these parts. Mention may be made of vacuum assisted resin infusion (VARI), pultrusion, vacuum bag molding, pressure bag molding, autoclave molding, resin transfer molding (RTM) and variations thereof as (HP-RTM, C-RTM, I-RTM), reaction injection molding (RIM), reinforced reaction injection molding (R-RIM) and variants thereof, press molding, compression molding, liquid compression molding (LCM) or sheet molding compound (SMC) or bulk molding compound (BMC).

A first preferred manufacturing process for manufacturing composite parts are processes according to which the liquid composition is transferred to the fibrous substrate by impregnation of the fibrous substrate in a mold. The processes requiring a mold a listed above and comprise the wording molding.

A second preferred manufacturing process for manufacturing composite parts are processes according to which the liquid composition is used in pultrusion process. The fibres are guided through a resin batch comprising the composition according to the invention. The fibres as fibrous substrate are for example in form of a unidirectional roving or a continuous filament mat. After impregnation in the resin bath the wetted fibres are pulled through a heated die, where polymerization takes place.

A third preferred manufacturing process is vacuum assisted resin infusion (VARI).

A fourth preferred manufacturing process is resin transfer molding (RTM) and variations thereof as (HP-RTM, C-RTM, I-RTM) and more preferred compression resin transfer molding (C-RTM).

The process for manufacturing composite parts, but also mechanical or structured parts or products, can additionally comprise the step of post forming. The post forming includes bending as changing the form of the composite part.

The process for manufacturing composite parts, but also mechanical or structured parts or products, can additionally comprise the step of welding or gluing or laminating.

The thermoplastic composite parts obtained from the processes according to the invention can be post formed after polymerization of the liquid composition of the invention. The forming includes bending as changing the form of the composite.

The thermoplastic parts or manufactured composite parts obtained after polymerization of the liquid composition of the invention and/or from the processes according to the invention can be welded, glued or laminated.

As regards the use of the mechanical parts made of composite material thus manufactured, mention may be made of automotive applications, transport applications such as buses or lorries, nautical applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building for example composite rebars, dowels and stirrups for civil engineering and high rise construction, wind turbine part for example spar cap of girder of wind turbine blade, furniture part, construction or building part, telephone or cellphone part, computer or television part, or printer or photocopier part.

In a first preferred embodiment the mechanical part made of composite material is especially a material for construction or building for example composite rebars, dowels and stirrups for civil engineering and high rise construction.

In a second preferred embodiment the mechanical part made of composite material is especially a wind turbine part for example a spar cap of girder of wind turbine blade.

EXAMPLES

First Step: Preparation of a Liquid Composition or the (meth)acrylic Syrup

A liquid composition is prepared by dissolving 20% by weight of the PMMA (BS520, a copolymer of MMA comprising ethyl acrylate as comonomer) as (P1) in 80% by weight of methyl methacrylate as (M1), which is stabilized with HQME (hydroquinone monomethyl ether).

To this liquid composition are added different initiators as mixtures of two or three different initiators (Ini1) and (Ini2) or (Ini1), (Ini2) and (Ini3). As initiators (Ini1) or (Ini2) or (Ini3) are used di(4-tert-butylcyclohexyl) peroxydicarbonate (P16—Perkadox® 16 from the company Akzo Nobel), benzoyl peroxide (BPO—Perkadox® CH50X from the company Akzo Nobel), dilauroyl peroxide (LP—Luperox® LP from the company Arkema) and didecanoyl peroxide (DEC—Luperox® DEC from the company Arkema) and 2,5-dimethyl-2,5-di(2-ethylhexanoyl peroxy)hexane (Tx141—Trigonox® 141 from the company Akzo Nobel).

The comparative examples have no mixture of three initiators (Ini1), (Ini2) and (Ini3) according to the invention.

Second Step: Polymerization of a Liquid Composition or the (meth)acrylic Syrup

Polymerization of respective compositions is made by adding to 100 parts by weight of the liquid composition (based on (M1) and (P1) only) the initiators as indicated in table 1. The liquid composition is used to impregnate a fibrous substrate. The respective compositions are put in a metallic press as mould which is heated up to varying temperatures from 100° C. to 115° C. under a pressure of 10 bars.

With help of a thermocouple the slight temperature increase inside the composition is measured over the time until the maximum pic. The time at the maximum pic of the respective samples at the varying temperatures of the press is measured and given in table 2 for each composition.

TABLE 1 compositions of initiators

|  | Ini1 [phr] | Ini2 [phr] | Ini3 [phr] |
| --- | --- | --- | --- |
| Comparative example 1 | P16 2 | LP 2 | — |
| Comparative example 2 | P16 2 | LP 1 | — |
| Comparative example 3 | P16 1 | DEC 2 | — |
| Comparative example 4 | P16 1 | LP 2 | — |
| Example 1 | P16 1 | DEC 1 | BPO 1 |
| Example 2 | P16 1 | DEC 1 | TX141 1 |

TABLE 2

Results in press at different press temperatures

|  | Pic time/[s] at | | |
| --- | --- | --- | --- |
| Press temperature | 105° C. | 110° | 115° C. |
| Comparative example 1 | 132 | 121 | — |
| Comparative example 2 | 125 | — | — |
| Comparative example 3 | 140 | 128 | 122 |
| Comparative example 4 | 147 | 136 | 120 |
| Example 1 | 163 | 138 | 123 |
| Example 2 | — | 147 | — |

TABLE 3

Aspect of mould release at different press temperatures

|  | Pic time/[s] at | | |
| --- | --- | --- | --- |
| Press temperature | 105° C. | 110° | 115° C. |
| Comparative example 1 | + | 0 | * |
| Comparative example 2 | + | 0 | |
| Comparative example 3 | + | 0 | * |
| Comparative example 4 | + | + | * |
| Example 1 | + | + | + |
| Example 2 |  | + |  |

Symbols in table 3 mean:
+ easy demoulding from press without any problem
0 difficult to demould, soft sometimes sticky sample
* Incomplete polymerization Table 2 shows a decrease of polymerization time for the examples and comparative examples with increasing mould temperature which signifies better kinetics, faster polymerization, while only the examples can be easily demoulded at higher temperature, signifying having a good conversion.

The invention claimed is:
1. A liquid composition comprising,
a) a (meth)acrylic polymer (P1),
b) a (meth)acrylic monomer (M1), and
c) three initiators (Ini1), (Ini2) and (Ini3),
said liquid composition having a dynamic viscosity of between 10 mPa*s and 10,000 mPa*s at 25° C.,
wherein the three initiators (Ini1), (Ini2) and (Ini3) have at any given temperature different half-life times $t_{1/2}$,
wherein the first initiator (Ini1) has a half-life time $t_{1/2}$ of 1 hour at a temperature between 40° C. and 90° C.,
wherein the second initiator (Ini2) has a half-life time $t_{1/2}$ of 1 hour at a temperature between 70° C. and 100° C. and a half-life time $t_{1/2}$ that is at least two times the half-life time $t_{1/2}$ of the first initiator (Ini1) at a given temperature ($T_1$), and
wherein the third initiator (Ini3) has a half-life time $t_{1/2}$ of 1 hour at a temperature between 75° C. and 160° C. and a half-life time $t_{1/2}$ that is at least two times the half-life time $t_{1/2}$ of the second initiator (Ini2) at the given temperature ($T_1$),
wherein the given temperature ($T_1$) is between 40° C. and 160° C.

2. The liquid composition as claimed in claim 1, wherein the level of the three initiators (Ini1), (Ini2) and (Ini3) together in the composition is between 0.1 phr and 15 phr relative to the sum of (meth)acrylic monomer (M1) and (meth)acrylic polymer (P1).

3. The liquid composition according to claim 1, wherein the given temperature $T_1$ is between 40° C. and 140° C.

4. The liquid composition according to claim 1, wherein the first initiator (Ini1) has a half-life time $t_{1/2}$ of 1 hour at a temperature between 50° C. and 75° C.

5. The liquid composition according to claim 1, wherein the temperature for a given half-life time between the initiators (Ini3), (Ini2) and (Ini1) is different by at least 5K.

6. The liquid composition according to claim 1, wherein the temperature for a given half-life time between the initiators (Ini3) and (Ini1) is different by 10K to 50K.

7. The liquid composition according to claim 1, wherein the temperature for a given half-life time between the initiators (Ini2) and (Ini1) is different by 6K to 40K.

8. The liquid composition according to claim 1, wherein the initiators (Ini3), (Ini2) and (Ini1) are selected from the group consisting of diisobutyryl peroxide, cumyl peroxyneodecanoate, di(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butylperoxy-2-ethylhexanoate, tert-butyl peroxydiethylacetate, tert-butylperoxyisobutyrate, 1, 1-di-(tert-butylperoxy)-3,3,5-trimethylcyclohexane, 1,1-di(tert-amylperoxy)cyclohexane, 1,1-di-(tert-butylperoxy)-cyclohexane, tert-amylperoxy-2-ethylhexylcarbonate, tert-amyl peroxyacetate, tert-butyl peroxy-3,5,5-trimethylhexanoate, 2,2-di-(tert-butylperoxy)-butane, tert-butylperoxyisopropylcarbonate, tert-butyl peroxy-2-ethylhexylcarbonate, tert-amylperoxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tertbutylcumylperoxide, 2,5-dimethyl-2,5-di(tert-butylperoxy)hexyne-3, di-tert-butyl peroxide, 3,6,9-triethyl-3,6,9-trimethyl-1,4,7-triperoxonane, 2,2'-azobisisobutyronitrile (AIBN), 2,2'-azodi-(2-methylbutyronitrile), azobisisobutyramide, 2,2'-azobis(2,4-dimethylvaleronitrile), 1,1'-Azodi(hexahydrobenzonitrile), and 4,4'-azobis(4-cyanopentanoic).

9. The liquid composition according to claim 1, wherein the initiator (Ini1) is selected from the group consisting of cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl) peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, and 1,1,3,3-tetramethylbutyl peroxy-2-ethylhexanoate.

10. The liquid composition according to claim 1, wherein the initiator (Ini2) is selected from the group consisting of tert-amyl peroxypivalate, tert-butyl peroxypivalate, di(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butylperoxyisopropyl)-benzene, 2,5-dimethyl-2,5-di-(tert-butylperoxy)-hexane, tertbutylcumyl peroxide, 2,5-dimethyl-2,5-di(tert-butylperoxy)hexyne-3, di-tert-butyl peroxide, and 3,6,9-triethyl-3,6,9-trimethyl-1,4,7-triperoxonane.

11. The liquid composition according to claim 1, wherein the initiator (Ini3) is selected from the group consisting of tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide, and 3,6,9-triethyl-3,6,9-trimethyl-1,4,7-triperoxonane.

12. The liquid composition according to claim 1, wherein the (meth)acrylic polymer (P1) comprises at least 50% by weight of methyl methacrylate (MMA).

13. The liquid composition according to claim 1, wherein the (meth)acrylic monomer is selected from the group consisting of methyl methacrylate, ethyl methacrylate, methyl acrylate, ethyl acrylate, methacrylic acid, acrylic acid, n-butyl acrylate, isobutyl acrylate, cyclohexyl acrylate, cyclohexyl methacrylate, isobornyl acrylate and isobornyl methacrylate, and mixtures thereof.

14. The liquid composition according to claim 1, wherein the (meth)acrylic monomer(s) (M1) in the liquid composition or (meth)acrylic syrup are present in proportions of between 40% and 90% by weight of the composition comprising (meth)acrylic monomer(s) (M1) and (meth)acrylic polymer (P1).

* * * * *